United States Patent
Chen et al.

(10) Patent No.: US 10,757,785 B2
(45) Date of Patent: Aug. 25, 2020

(54) DRIVER WITH OPEN OUTPUT PROTECTION

(71) Applicant: Koninklijke Philips N.V., Eindhoven (NL)

(72) Inventors: Zhi Quan Chen, Shanghai (CN); Duo L. Li, Shanghai (CN); Kang Li, Shanghai (CN); Matt J. Ma, Shanghai (CN); Hui Zhang, Shanghai (CN); Dennis Johannes Antonius Claessens, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 800 days.

(21) Appl. No.: 14/672,721

(22) Filed: Mar. 30, 2015

(65) Prior Publication Data

US 2016/0119987 A1   Apr. 28, 2016

Related U.S. Application Data

(63) Continuation of application No. PCT/EP2014/072806, filed on Oct. 24, 2014.

(51) Int. Cl.
*H05B 33/08* (2020.01)
*H05B 45/50* (2020.01)
(Continued)

(52) U.S. Cl.
CPC .......... *H05B 45/50* (2020.01); *H02M 3/1563* (2013.01); *H02M 1/36* (2013.01);
(Continued)

(58) Field of Classification Search
CPC .................. H05B 33/0818; H05B 33/0887
See application file for complete search history.

(56) References Cited

U.S. PATENT DOCUMENTS 5,825,137 A * 10/1998 Titus .................... H05B 41/295
315/291
7,511,437 B2   3/2009 Lys et al.
(Continued)

FOREIGN PATENT DOCUMENTS

CN          203674968 U    6/2014
WO          2012085800 A1   6/2012

OTHER PUBLICATIONS

Design of Analog CMOS Integrated Circuit, 2nd Edition, Behzad Razavi, 2017.*

*Primary Examiner* — Amr A Awad
*Assistant Examiner* — Jonathan G Cooper
(74) *Attorney, Agent, or Firm* — Akarsh P. Belagodu

(57) ABSTRACT

A load driver for driving a load and an LED module are disclosed. In one embodiment, the load driver comprises a converter circuit comprising a controllable switching element configured to be turned on and off and to perform power factor correction for power from a power supply to the load, wherein a control terminal of the controllable switching element is configured for receiving a startup current via the two output terminals, the controllable switching element configured to be turned on by the startup current. The converter circuit further comprises a first inductor, coupled to the power supply at a first end, and to ground at a second end via the controllable switching element, wherein a first one of the output terminals connects to a second end of the first inductor via a diode forwarded from the first inductor, a second one of the output terminals is coupled to the first end of the first inductor.

13 Claims, 6 Drawing Sheets

(51) Int. Cl.
*H02M 3/156* (2006.01)
*H02M 1/36* (2007.01)
*H02M 1/42* (2007.01)

(52) U.S. Cl.
CPC .......... *H02M 1/4225* (2013.01); *Y02B 20/341* (2013.01); *Y02B 70/126* (2013.01)

(56) References Cited

U.S. PATENT DOCUMENTS

| | | | |
|---|---|---|---|
| 7,550,934 B1 * | 6/2009 | Deng | H05B 33/0887 315/209 R |
| 2005/0093488 A1 | 5/2005 | Hung et al. | |
| 2012/0235581 A1 * | 9/2012 | Chou | H05B 33/0806 315/185 R |
| 2012/0299480 A1 | 11/2012 | Peting et al. | |
| 2013/0049589 A1 * | 2/2013 | Simi | H05B 33/0815 315/85 |
| 2013/0154482 A1 | 6/2013 | Ge et al. | |
| 2013/0155561 A1 * | 6/2013 | Lai | H02H 3/202 361/91.5 |

* cited by examiner

DRIVER WITH OPEN OUTPUT PROTECTION

FIELD OF THE INVENTION

The present invention relates in general to a switched-mode driver. Particularly, but not exclusively, the present invention relates to a switched-mode driver for use as an LED driver.

BACKGROUND OF THE INVENTION

In switched-mode drivers, such as those used for driving an LED, an output buffer capacitor is repeatedly charged and discharged. In case the driven LED is defective to provide an open circuit, or no LED is connected to the output terminals, the voltage over the output buffer capacitor may become very high, and thus the voltage over the output terminals may become very high, which is potentially dangerous and may cause damage to the electronic components. Known protection circuits comprise a relatively large number of components and are hence relatively costly. For example, numerous transistors, stabilivolt, capacitors, and other components may be used for sensing the voltage of a secondary transformer winding which is indicative of the load voltage. Additionally, the current open protection circuit starts and stops alternatively and results in burping of the driver: re-start again and again.

SUMMARY OF THE INVENTION

An object of the present invention is to provide a switched-mode driver with overvoltage/open load protection having a relatively low number of components and having good protection performance.

In one aspect, the present invention provides a method for providing a starting current for a driver for driving a load, the method comprising the step of providing the starting current via the load to be driven. The startup current is the current for turning on a switching element of the driver, such as a power switch in a power converter/power factor correction unit.

In another aspect, the present invention provides a method for providing an operating current or an operating voltage at a reference point in a driver for driving a load, wherein said operating current or operating voltage, respectively, is derived from a power voltage bus by coupling said reference point to said power voltage bus via the load to be driven.

In yet another aspect, the present invention provides a load driver for driving a load, comprising: two output terminals for coupling to the load; and a converter circuit comprising: a controllable switching element adapted to be turned on and off and perform power factor correction for a power from a supply to the load, wherein a control terminal of the controllable switching element is coupled to and in series with said two output terminals and is adapted for receiving a startup current (Is) via said two output terminals, said controllable switching element adapted to be turned on by said startup current (Is); wherein the converter circuit is a buck-boost converter and further comprises: a first inductor, coupled to the supply at a first end, and to the ground at a second end via said controllable switching element; wherein a first one of the output terminals connects to a second end of said first inductor via a diode forwarded from said first inductor, a second one of the output terminals is coupled to the first end of the first inductor.

In all of the above aspects, since the startup terminal providing the startup current is in series connection with the load terminals, there would not be any startup current in case the load is open, namely absence of the load, therefore the present invention offers an advantage in that a relatively simple circuit is provided that prevents the start of the driver if no load is present or if such load is defective to provide an open circuit. The present invention further offers an advantage in that the overvoltage/open load protection does not make the driver burp. Preferably, the above mentioned method and driver are for LED application. Further, this embodiment provides the application and specific circuit arrangement in the context of buck-boost converters.

Further, the second one of the output terminals connects to the first end of said first inductor via a diode forwarded from the second one of the output terminals. This embodiment can prevent the supply from providing the startup current to the controllable switching element.

Further, the control terminal of the controllable switching element connects to the second one of the output terminals. In this embodiment, the control terminal receives a startup current via the first one and then the second one of the output terminals, and there is no current flowing out of the second one if the load between the output terminals is open.

Further, the load driver further comprises an output buffer capacitor across the first one of the output terminals and the first end of said first inductor. The output buffer capacitor is for smoothing the power provided to the load and reducing ripple.

Further, the load driver further comprises aim 1, further comprising a startup resistor between the control terminal and the two output terminals. This embodiment can limit the startup current as the proper level.

Further, said switching element comprises a transistor and a base of said transistor is in series with said two output terminals, or said switching element comprises a MOSFET and a gate of said MOSFET is in series with said two output terminals. This embodiment provides more specific embodiment of the controllable switching element.

In a further embodiment, converter circuit further comprises: a third inductor electromagnetically coupled to said first inductor and coupled to said controllable switching element, said third inductor is adapted to being inductive of a high voltage in response to an over voltage on said first inductor and to turn off said switching element. This embodiment provides an over voltage protection against the open load after the driver has been started. Moreover, the combination of the open protection and the over voltage protection provides a hot-wiring function in which the load can be taken away and then put back during the operation and the load would continue work normally.

In a further embodiment, the converter circuit further comprises: a switching unit between a control terminal of said controllable switching element and the ground, adapted to draw current from the control terminal of said controllable switching element to turn it off; wherein said second inductor connects to a control terminal of said switching unit and applies the high voltage thereupon to turn on said switching unit. This embodiment provides a more detailed embodiment to implement the control of the switching element.

In a further embodiment, the converter circuit is a RCC circuit with a third inductor electromagnetically coupled to said first inductor and coupled to said controllable switching element, and a current sensing resistor coupled between the controllable switching element and the ground. This embodiment provides a detailed implementation for the switching control of the converter circuit. Alternatively, the converter circuit can also be controlled by a controller IC or MCU.

The present application also proposes an LED module, comprising: a load driver according to any of the above embodiments; and at least one LED coupled between said two output terminals such that the control terminal of the controllable switching element is in series with said LED.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more computer-readable storage mediums (generically referred to herein as "memory," e.g., volatile and non-volatile computer memory such as RAM, PROM, EPROM, and EEPROM, floppy disks, compact disks, optical disks, magnetic tape, etc.). In some implementations, the storage mediums may be encoded with one or more programs that, when executed on one or more processors and/or controllers, perform at least some of the functions discussed herein. Various storage mediums may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers. In some implementations, computer readable signal mediums may be encoded with one or more programs that, when executed on one or more processors and/or controllers, perform at least some of the functions discussed herein. For example, a signal medium can be an electromagnetic medium, such as a radio frequency medium, and/or an optical medium, through which a data signal is propagated.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF EMBODIMENTS

Although the present invention relates to a driver for any type of load, the driver is especially useful for application as an LED driver, and hereinafter the present invention will be specifically explained and illustrated for the example of an LED load, without this example reducing the scope of the invention to LEDs.

Figure 1:
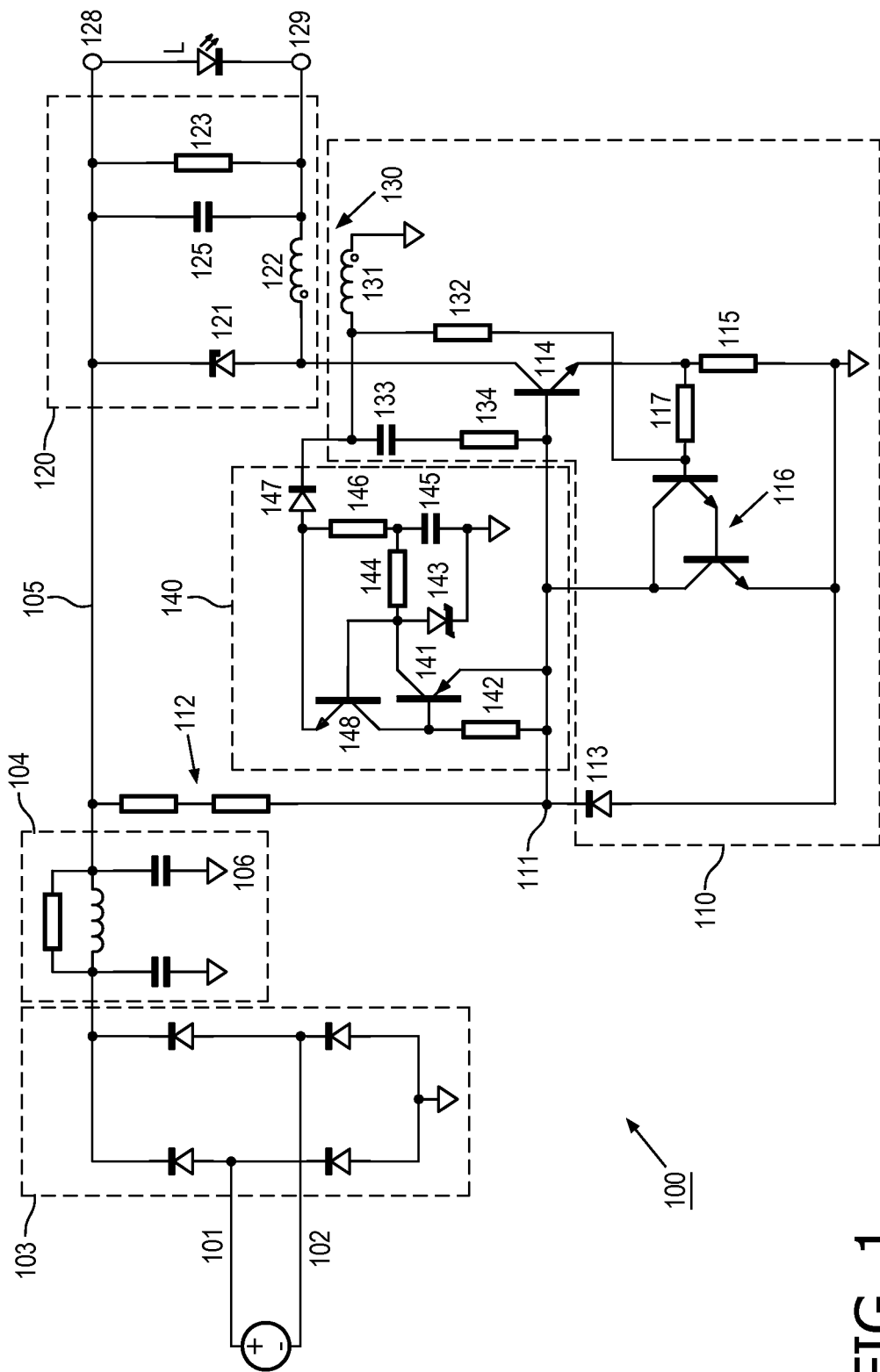
FIG. 1 schematically shows a circuit diagram of a prior art driver design.

FIG. 1 schematically shows a circuit diagram of a current driver 100 design. The driver 100 has input terminals 101, 102 for connecting to an AC mains, a rectifying stage 103 and an input filter stage 104. An output side of the input filter stage 104 connects to a positive voltage bus 105 and a negative or ground voltage bus 106. Block 110 is a converter circuit. It comprises a reference node 111 that is connected to the positive voltage bus 105 via a first resistor 112 and to the ground voltage bus 106 via a first diode 113, the cathode terminal of the first diode 113 being connected to the reference node 111.

In the converter circuit 110, a first NPN transistor 114 has its base terminal connected to the reference node 111, and has its emitter terminal connected to the ground voltage bus 106 via a current sensing resistor 115. A Darlington circuit 116, comprised of two NPN transistors, has its collector terminal connected to the reference node 111, has its emitter terminal connected to the ground voltage bus 106, and has its base terminal connected to the emitter terminal of the first NPN transistor 114 via a third resistor 117.

An output rectifying and filter stage 120 comprises a second diode 121 connected between the positive voltage bus 105 and the collector terminal of the first NPN transistor 114, the cathode terminal of the second diode 121 being connected to the positive voltage bus 105. A primary transformer winding 122 of a feedback transformer 130 has one terminal connected to the anode terminal of the second diode 121. A parallel arrangement of a fourth resistor 123 and an output buffer capacitor 125 is connected between the positive voltage bus 105 and a second terminal of the primary transformer winding 122.

A secondary transformer winding 131 of the feedback transformer 130 has one terminal connected to the ground voltage bus 106, and has a second terminal connected to the base terminal of the Darlington circuit 116 via a fifth resistor 132. A series arrangement of a second capacitor 133 and a sixth resistor 134 is connected between the second terminal of the secondary transformer winding 131 and the reference node 111.

The driver 100 has output terminals 128 and 129 connected to the positive voltage bus 105 and the second terminal of the primary transformer winding 122, respectively. The drawing shows a driven LED load L connected between these two output terminals 128, 129.

In case the driven LED is defective to provide an open circuit, or no LED is connected to the output terminals 128, 129, the voltage over the output buffer capacitor 125 may become very high, and thus the voltage over the output terminals 128, 129, may become very high, which is potentially dangerous and may cause damage to the electronic components.

To prevent this problem, the illustrated driver design includes an output overvoltage/open load protection circuit 140 connected between the reference node 111 and the ground. As can be seen in FIG. 1, the output overvoltage/open load protection circuit 140 comprises a PNP transistor 141 having its emitter terminal connected to the reference node 111, a resistor 142 connected between the reference node 111 and the base terminal of transistor 141, a Zener diode 143 connected between the ground voltage bus 106 and the collector terminal of transistor 141, a resistor 144 connected to the collector terminal of transistor 141, a capacitor 145 connected between the resistor 144 and the ground voltage bus 106, a resistor 146 connected to the node between capacitor 145 and resistor 144, a diode 147 connected between the resistor 146 and the second terminal of the secondary transformer winding 131, and an NPN transistor 148 having its base terminal connected to the collector terminal of transistor 141, having its collector terminal connected to the base terminal of transistor 141, and having its emitter terminal connected to the node between diode 147 and resistor 146. Thus, the output overvoltage protection circuit 140 includes eight components.

The operation principle of the open load protection is elucidated here, according to one example. When the load L is open, output capacitor 125 is charged to a high voltage. Via the coupled windings 122 and 131 of the feedback transformer 130, the capacitor 145 is charged. When the voltage across the capacitor 145 exceeds the Zener voltage of the Zener diode 143, the Zener diode 143 is in brakedown mode. The transistor 148 and 141 are turned on, and pull the voltage at the node 111 to the ground, thereby turning off the first transistor 114. However, when the capacitor 145 discharges to a low level, it can not keep the transistors 148 and 141 on, thus the protection circuit 140 stops from pulling the node 111 to the ground. The voltage bus 105 applies a starting voltage on the base of the transistor 114 again via the node 111, causing the transistor 114 to turn on again and the capacitor 125 is charged again. The above steps repeat as long as the open load condition continues. Consequently, the protection circuit 140 periodically starts and stops, which is called "burping". This is not desirable for the driver.

Figure 2:
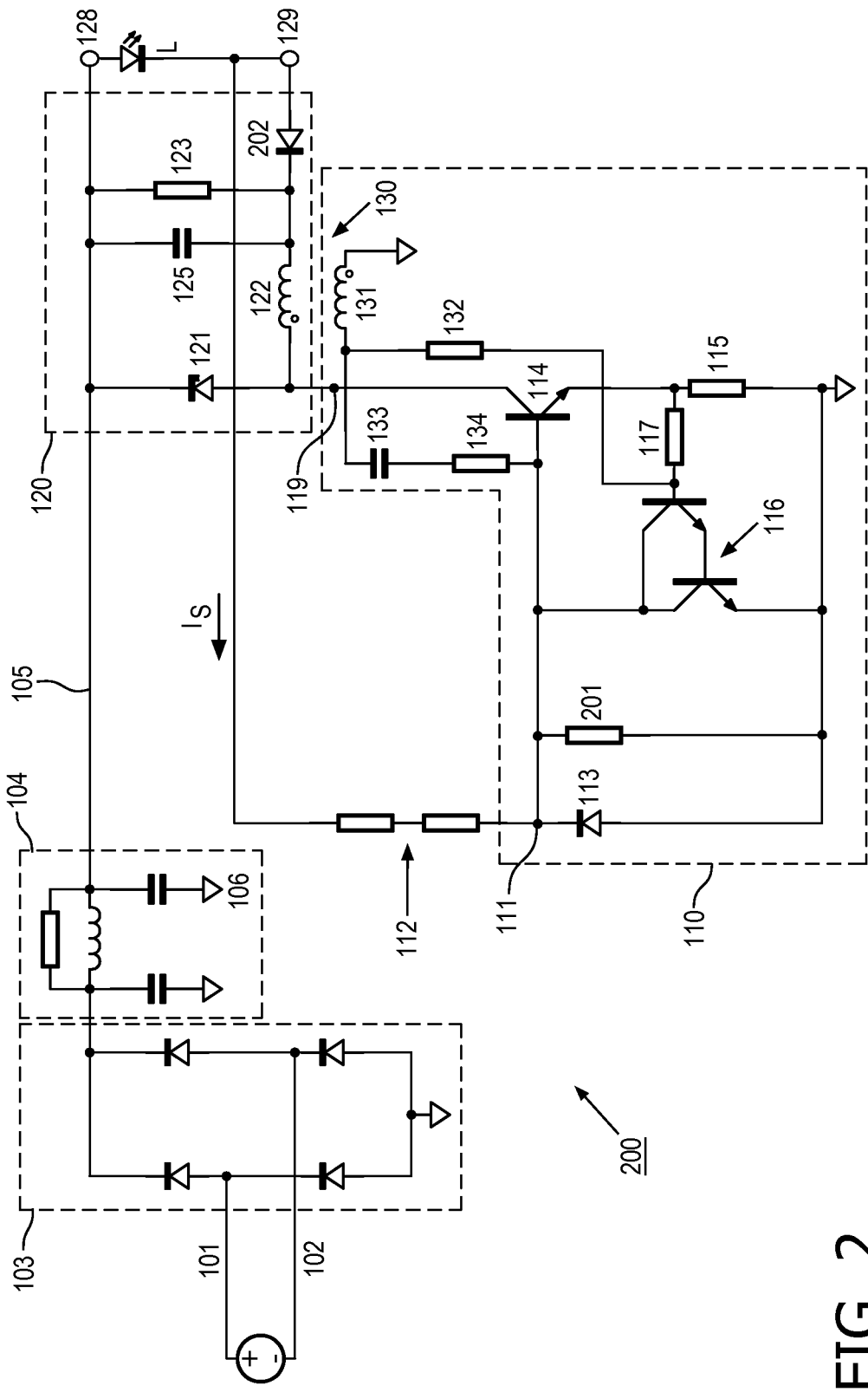
FIG. 2 schematically shows a circuit diagram of an embodiment of a driver according to the present invention.

FIG. 2 schematically shows a circuit diagram of a driver 200 according to the embodiments of the present invention.

In a first embodiment, the driver 200 comprises an output capacitor 125, two output terminals 128 and 129 coupled to the output capacitor 125 for coupling the load L, a coupling diode 202, in forward connection from one output terminal 129 to a terminal of the output capacitor 125, and a converter circuit 110 with a load terminal and a startup terminal 111, wherein said load terminal being coupled to the one output terminal 129 via the coupling diode 202, for coupling the load L in loop with the voltage bus 105, and the startup terminal 111 is coupled to the one output terminal 129 to receive a startup current (Is) via the driven load L, if the driven load L is present to conduct this startup current. Notably, the startup terminal 111 is coupled to and in series with the two output terminals 129 and 128, namely in case the load L is present, the startup terminal 111 is in series connection with the load L.

In another embodiment, the driver 200 further comprises a load resistor 123, in parallel connection with the output capacitor 125.

Yet in another embodiment, the driver 200 further comprises a startup resistor 112 between the startup terminal 111 and the one output terminal 129. And said converter circuit 110 further comprises a switching element 114, for example a transistor 114 for selectively coupling the load L between the voltage bus 105 and the ground 106 to form the close loop, and said startup current (Is) is for turning said transistor 114 on. It can be understood that other types of switching elements, for instance MOSFET transistors, are also applicable.

Figure 3:
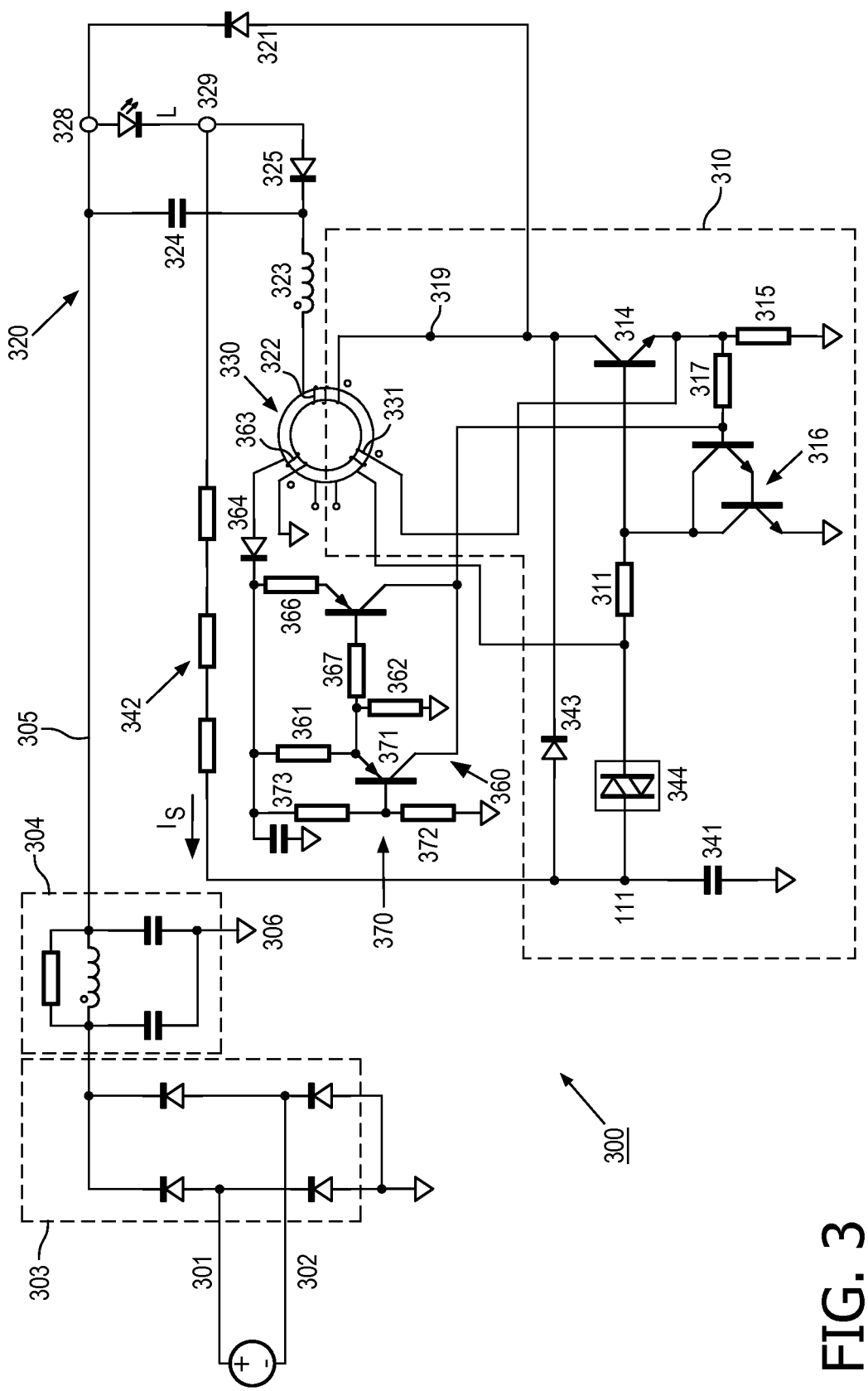
FIG. 3 schematically shows a circuit diagram of another embodiment of a driver according to the present invention.

There are many ways of using the startup current to turn on the transistor 114. FIG. 2 shows that the startup resistor 112 connects to a bias voltage node formed by a grounded resistor 201 connected in parallel to diode 113. The startup current would form a startup voltage across the ground resistor 201 to provide enough base voltage for the transistor 114 to make it start to be on. In another embodiment, as shown in FIG. 3, further described below, the startup current is used for charging a startup capacitor to provide enough base voltage for the transistor.

The design of the LED driver 200 according to the present invention deviates from the driver 100 of FIG. 1 in the following features:
1) lack of overvoltage protection circuit 140;
2) first resistor 112, hereinafter also indicated as "startup resistor," connects to output terminal 129 instead of positive voltage bus 105;
3) a ground resistor 201 is connected in parallel to diode 113;
4) a coupling diode 202 is connected in forward form between output terminal 129 and the intersection of the fourth resistor 123, the output buffer capacitor 125 and the primary transformer winding 122.

It will be clear that the number of components is substantially lower than the prior art design, thus substantially reducing the costs. It is to be noted that the illustrated examples include an LED as the load of the driver, but the present invention is not limited to LED and other types of load are also applicable.

In operation, in case an LED L to be driven is present, the base terminal of first transistor 114 receives positive bias voltage from the positive voltage bus 105 via the load LED L and the startup resistor 112, so that the converter circuit 110 is operating normal. Startup resistor 112 and ground resistor 201 operate as voltage divider for said bias voltage. When the voltage across resistor 201 exceeds Vbe of the first transistor 114, the first transistor 114 turns on and the LED L is coupled in a closed loop with the power bus 105 and the ground. The current in the collector-emitter branch of the first transistor 114 develops a sensing voltage over the current sensing resistor 115, this sensing voltage being indicative of the load current, which sensing voltage is provided as an input voltage to the base terminal of the Darlington circuit 116. When the load current is high enough, the Darlington circuit 116 will turn on so that the base voltage of the first transistor 114 is lowered and the first transistor 114 is turned off. This operation is repeated thereby the LED is driven. Said first transistor 114 is the switching transistor of the switched-mode driver.

In case there is no load LED L, the startup resistor 112 does not receive any positive voltage, with the coupling diode 202 also blocking current from the positive voltage bus 105 towards the startup resistor 112 through the capacitor 125 and through the resistor 123, and the base terminal of the first transistor 114 is pulled down to the voltage level of the ground voltage bus 106 by the ground resistor 201, which prevents the driver from starting. Thus, in an efficient manner, a high voltage at the output is prevented to develop. It is further noted that the coupling diode 202 prevents the output buffer capacitor 125 from discharging in the startup resistor 112.

Figure 4:
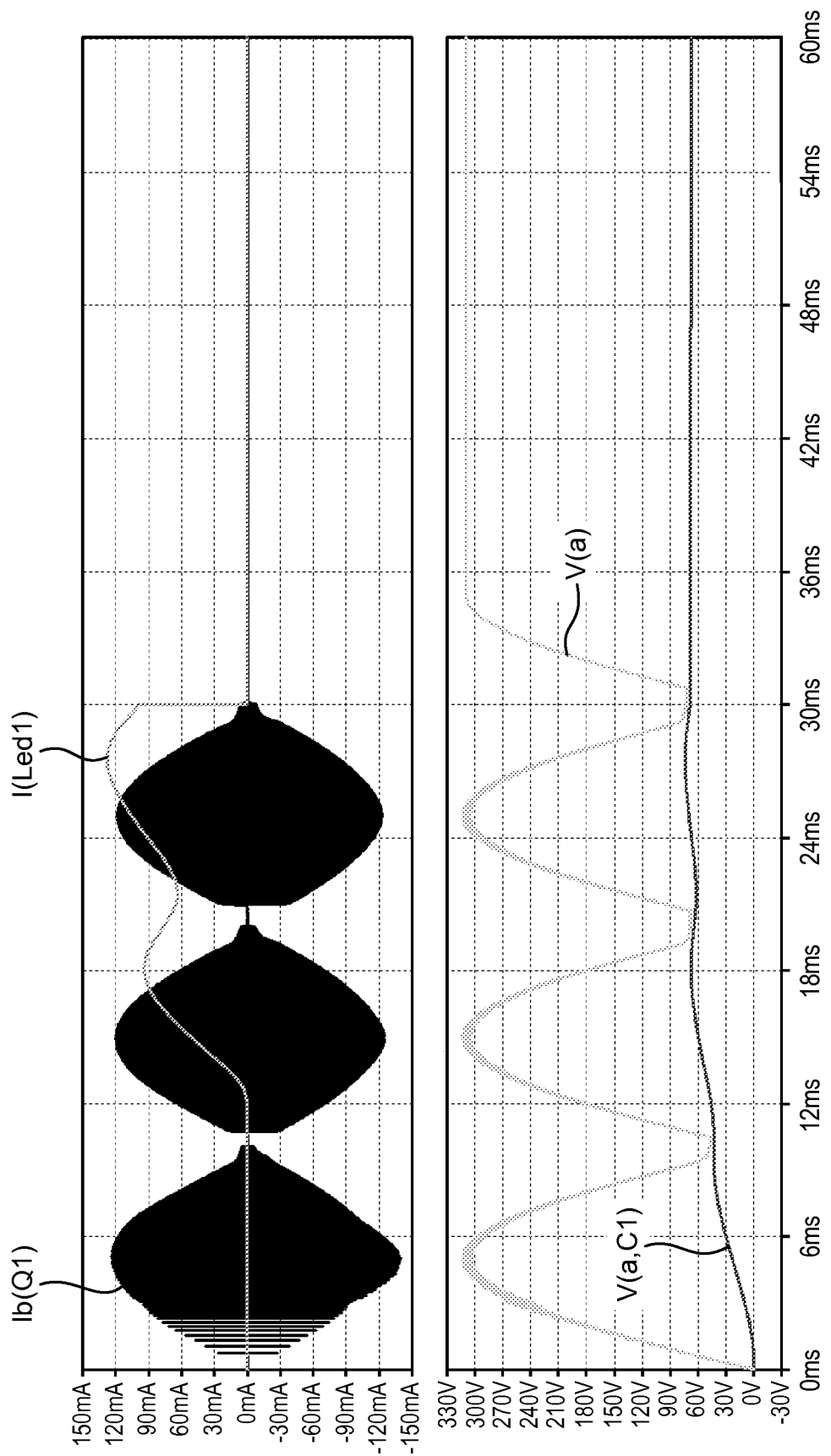
FIGS. 4 and 5 show graphs of current/voltage signals for illustrating the operation of the circuit as shown in FIG. 2.
Figure 5:
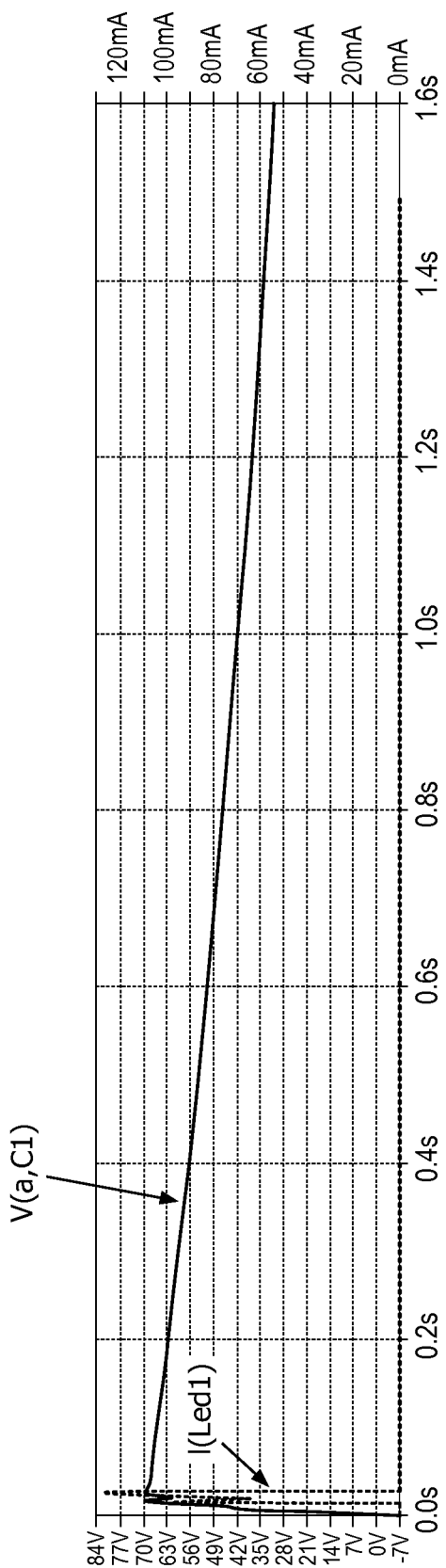

FIG. 4 and FIG. 5 illustrate current and voltage signals as a function of time in the driver 200 embodiment as shown in FIG. 2. More specifically, the upper graph of FIG. 4 shows the base current Ib(Q1) of the switching transistor 114 and the load current I(Led1) in the LED L. At time 30 ms, the load is deliberately interrupted. As to the base current Ib(Q1), it can be seen that after the load is open, there is no burping/transient uprise which would occur due to the re-start of the protection circuit 140 in the driver as shown in FIG. 1. The lower graph of FIG. 4 shows the voltage V(a,C1) over the output buffer capacitor 125 and the voltage V(a) at the output terminal 128, i.e. at the positive bus 105. It can be seen that the voltage over the capacitor would not be charged to an over-high value. The graph of FIG. 5 shows the voltage V(a,C1) over the output buffer capacitor 125 and the load current I(Led1) in a long term. The load current comes to zero once the load is open, and the voltage over the output buffer the capacitor 125 decreases gradually.

FIG. 3 schematically shows a circuit diagram of a constant current LED driver 300 comprising a ring core transformer in accordance with embodiments of the present invention.

The driver 300 has input terminals 301, 302 for connecting to AC mains, a rectifying stage 303 and an input filter stage 304. An output side of the input filter stage 104 connects to a positive voltage bus 305 and a negative or ground voltage bus 306. Block 310 is a converter circuit. In the converter circuit 310, a first NPN transistor 314 has its base terminal connected to one terminal of a first resistor 311, and has its emitter terminal connected to the ground voltage bus 306 via a second resistor 315. A Darlington circuit 316, comprised of two NPN transistors, has its collector terminal connected to the base terminal of the first NPN transistor 314, has its emitter terminal connected to the ground voltage bus 306, and has its base terminal connected to the emitter terminal of the first NPN transistor 314 via a third resistor 317. The first NPN transistor 314 is the switching transistor of the switched-mode driver 300.

An output rectifying and filter stage 320 comprises an output buffer capacitor 324 having one terminal connected to the positive voltage bus 305. A first diode 321 is connected between the positive voltage bus 305 and the collector terminal of the first NPN transistor 314, the cathode terminal of the first diode 321 being connected to the positive voltage bus 305. A primary transformer winding 322 of a feedback ring-core transformer 330 has one terminal connected to the anode terminal of the first diode 321. An inductor 323 is connected between a second terminal of the primary transformer winding 322 and the output buffer capacitor 324.

A second transformer winding 331 has one terminal connected to a second terminal of the first resistor 311, and has a second terminal connected to the emitter terminal of the first NPN transistor 314.

The driver 300 has a first output terminal 328 connected to the positive voltage bus 105 and a second output terminal 329 coupled to an intersection node between the output buffer capacitor 324 and the inductor 323 via a second diode 325, with the anode of the second diode 325 directed towards the second output terminal 329. The drawing shows a driven LED L connected between the two output terminals 328, 329.

The driver 300 further comprises a storage capacitor 341 having one terminal connected to the ground voltage bus 306 and having its second terminal connected to the second output terminal 329 via a charging resistor 342, also indicated as "startup resistor." A third diode 343 connects the second terminal of the storage capacitor 341 to the collector terminal of the first transistor 314, with the anode of the third diode 343 being directed to the storage capacitor 341. A diac 344 connects the second terminal of the storage capacitor 341 to the second terminal of the first resistor 311.

The operation is as follows. In case an LED L to be driven is present, the storage capacitor 341 is charged from the positive voltage bus 105 via the load LED L and the charging resistor 342. Once the voltage of the storage capacitor 341 reaches a threshold value, the diac 344 can be triggered and provides base current to the first transistor 314, which then can quickly discharge the storage capacitor 341 via the third diode 343, at the same time drawing current in the primary transformer winding 322. This can be repeated until the first transistor 314 operates in its saturation region. When the load current is big enough, the current sensing resistor 315 can provide a high voltage indicative of the load current to the Darlington circuit 316, which can lower the base voltage of the first transistor 314 and thus turn off the first transistor 314. This operation can be repeated thereby driving the LED.

In case there is no load LED L, the storage capacitor 341 may not be charged and the diac 344 may not fire, so that the first transistor 314 can not be brought into conductance and the driver 300 can not start. Thus, in an efficient manner, a high voltage at the output is prevented to develop.

In the driver 300 embodiment as shown in FIG. 3, since the feedback transformer 300 is implemented as a ringcore, it may be desirable to have a constant load current. The voltage of the two transistors in the Darlington circuit 316 is 1.2V and the resistance of resistor 315 may be constant, thus the current flowing through resistor 315 may be constant.

Also, since a ringcore is used, temperature drift may pose as a serious issue. In order to solve or at least reduce temperature drift, the driver 300 may be implemented with a temperature compensation circuit 360. The temperature compensation circuit 360 comprises a NTC resistor 361, which has one terminal connected to ground 306 via a resistor 362, and which has its other terminal connected to the cathode of a diode 364 having its anode connected to a third transformer winding 363. A PNP transistor 365 has its emitter terminal connected to the cathode of the diode 364 via a resistor 366, has its base terminal connected to the node between the NTC resistor 361 and the resistor 362 via a resistor 367, and has its collector terminal connected to the base terminal of the Darlington circuit 316. The transistor 365 provides a bias current into the base terminal of the Darlington circuit 316. It is noted that an NTC resistor has a negative temperature coefficient, i.e. the resistance decreases with increasing temperature.

The operation of the temperature compensation circuit 360 is as follows. When the temperature increases, the Vbe of the Darlington circuit 316 drifts (decreases) and leads to an earlier OFF of the switching transistor 314, thereby decreasing the load current. On the other hand, as the temperature increases, the resistance of NTC resistor 361 decreases, causing the base voltage of transistor 365 to increase and hence the collector current of transistor 365 to decrease. Thus, the bias current into the base terminal of the Darlington circuit 316 decreases, thus Darlington circuit 316 is turned ON slower and hence the transistor 314 is turned OFF slower and more load current can be provided.

The driver 300 is further shown with an over-temperature protection circuit 370. The over-temperature protection circuit 370 comprises a PNP transistor 371 having its emitter terminal connected to the node between the NTC resistor 361 and the resistor 362, having its collector terminal connected to the base terminal of the Darlington circuit 316, and having its base terminal connected to ground bus 306 via a resistor 372 and to the cathode of the diode 364 via a resistor 373. A capacitor 374 is connected in parallel to the series arrangement of resistors 372 and 373.

The operation of the over-temperature protection circuit 370 is as follows.

As the temperature increases, the resistance of NTC resistor 361 decreases, causing the emitter voltage of transistor 371 to increase. When the temperature reaches a certain threshold value, the emitter-to-base voltage difference is higher than 0.6V, and thus transistor 371 turns ON and produces a collector current which flows into the base of the Darlington circuit 316. This additional base current of the Darlington circuit 316 leads to an earlier cut-off of the switching transistor 314. Therefore, the LED load is off and the power is limited, realizing over-temperature protection.

Figure 6:
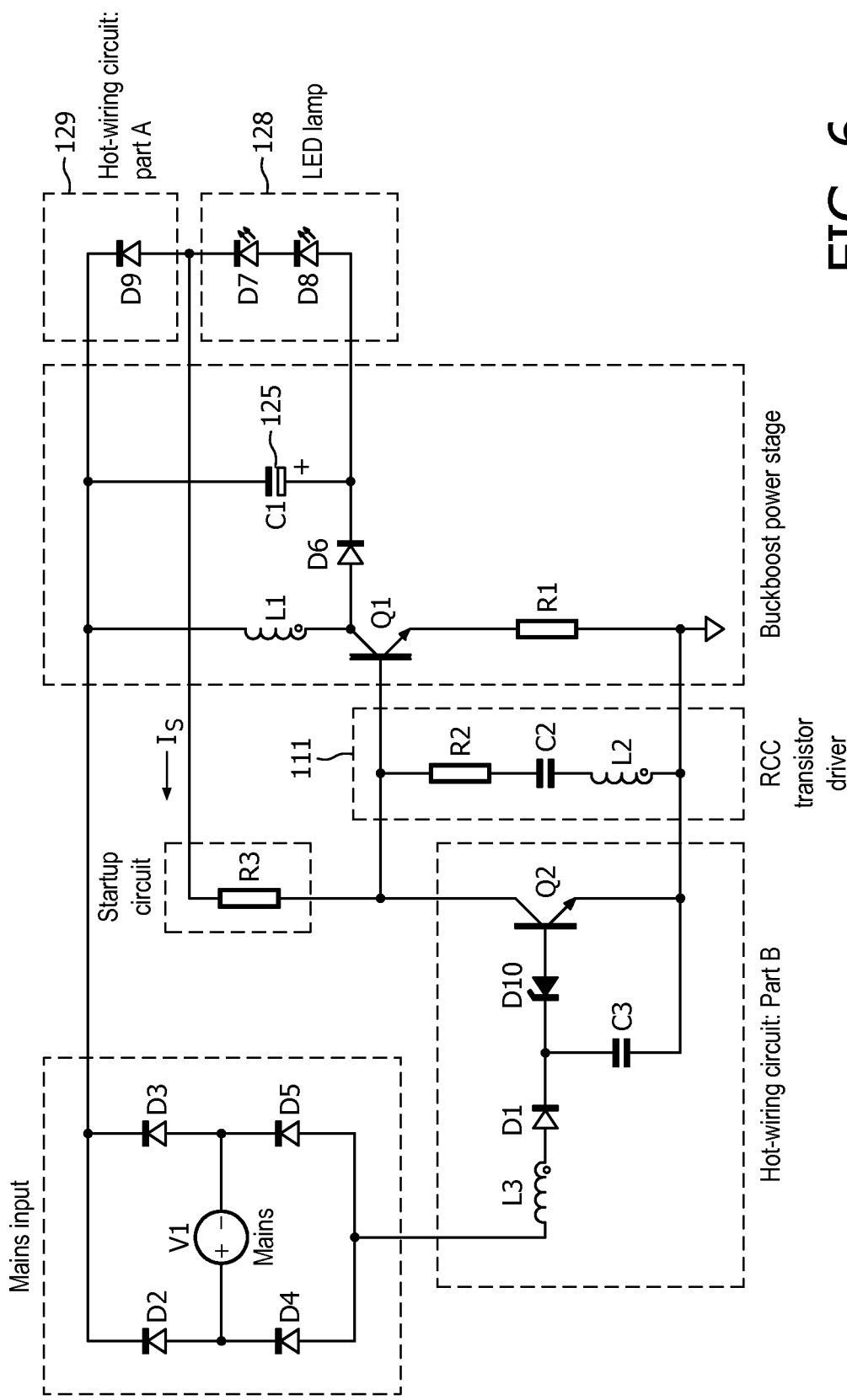
FIG. 6 shows another embodiment of the invention based on a buck-boost converter.

FIG. 6 shows another embodiment of the invention, comprising a buck-boost converter.

As shown in FIG. 6, the load driver is configured for driving the LED load D8 and D7. The load driver comprises two output terminals 128 and 129 for coupling to the load D8 and D7, and a converter circuit 610, also denoted as the buck-boost power stage. The converter circuit 610 comprises a controllable switching element Q1 configured to be turned on and off and perform power factor correction for a power from a power supply 603 which is the mains input rectified by the diode bridge D2 to D5, to the load D8 and D7 The control terminal of the controllable switching element Q1 is coupled to and in series with said two output terminals 128, 129 and is adapted for receiving a startup current (Is) via the two output terminals 128, 129, said the controllable switching element is configured to be turned on by said startup current (Is).

The converter circuit is a buck-boost converter and further comprises a first inductor L1, coupled to the power supply 603 at a first end, and to the ground at a second end via the controllable switching element Q1. The first output terminal 128 connects to a second end of said first inductor L1 via a diode D6 forwarded from said first inductor L1. The second output terminal 129 is coupled to the first end of the first inductor L1.

In one embodiment, the output terminal 129 connects to the first end of said first inductor L1 via a diode D9 forwarded from the output terminal 129, and a control terminal of the controllable switching element Q1 connects to the output terminal 129. An output buffer capacitor C1 is across the output terminal 128 and the first end of the first inductor L1 so as to smooth the power provided to the LED load.

In this configuration, when the user switches on the mains input, if there is no LED inserted between the output terminals 128 and 129, there is no current flowing at the output terminal 129 to the control terminal of the controllable switching element Q1, thus the LED driver does not start-up. Until the user inserts the LEDs D7 and D8, because the LEDs D7 and D8 is series in the start-up circuit of the driver, startup current can be provided as follows. The current can flow from the mains input, via the first inductor L1, diode D6, LED load, and startup resistor R3, and charging the capacitor C2 to increase the base voltage of Q1 to turn it on. So after the user inserts the LEDs D7 and D8, as the power switch is turned on the switching element and the LED driver starts-up.

The converter as shown in FIG. 6 is a self-oscillation converter based on RCC. The moment the transistor Q1 is closed, the inductor L1 may generate voltage across it, and the second inductor L2, electromagnetically coupled to the first inductor L1 and coupled to the controllable switching element Q1, may be inductive of a positive voltage at the base of the transistor Q1 and accelerate the transistor Q1 to turn on. A current sensing resistor R3 is coupled between the controllable switching element Q1 and the ground to sense the current flowing in the first inductor L1. When it reaches a proper current value, a voltage across the sense resistor R elevates the emitter potential of the transistor Q1 to a level such that the Vbe of Q1 is not enough to keep Q1 on and Q1 starts to turn off During turning off of Q1, the inductor L1 freewheels the current to power the load. Also the inductor L1 may resonate with the body capacitor of the transistor Q1 and generates a voltage across the inductor L1 that has a negative potential at the dotted terminal. The second inductor L2 is inductive of such voltage and generates a positive voltage at the base of the transistor Q1 to turn on the transistor Q1 again. Such operation repeats.

To realize over voltage protection during operation, the load driver further comprises a switching unit Q2 between a control terminal of said controllable switching element Q1 and the ground, adapted to draw current from the control terminal of said controllable switching element Q1 to turn it off. The load driver further includes a third inductor L3 electromagnetically coupled to the first inductor L1 and coupled to the controllable switching element Q2. The third inductor L3 is configured to being inductive of a high voltage in response to an over voltage on the first inductor L1 and to turn off the switching element. The second inductor L2 connects to a control terminal of the switching unit Q2 and applies the high voltage thereupon to turn on said switching unit Q2. Further, there is a capacitor C3 and a Zener D10 between the third inductor L3 and the control terminal of Q2, for the purpose of buffering.

More specifically, after first-time start-up, if the user takes off the LED D7 and D8 or D7 and D8 malfunctions as open load, the voltage of C1 increases instantly since the buck-boost converter still operates to charge the capacitor C1. And the coupling effect between L1 and L3 can cause the voltage of C3 to increase correspondingly. When voltage of C3 reaches enough level to trigger the zener D10 and then Q2 can turn on and can pull the base of Q1 down to ground. Then the RCC transistor driver can stop switching and the output voltage can decrease. Since the load the open, there is no startup current for the power switch Q1 thus the converter may not start again.

If the user inserts the LEDs again or replaces the malfunctioning LEDs, the operation of the driver is same the user inserts the LED as discussed above. The hot-wiring function is thus achieved.

Summarizing, according to embodiments of the present invention, starting current for a load driver for driving a load is provided via the load. Further, according to the embodiments of the present invention, in a load driver for driving a load, an operating current or an operating voltage at a reference point is derived from a power voltage bus by coupling said reference point to said power voltage bus via the load.

Further, according to the various embodiments of present invention, a load driver for driving a load comprises an output capacitor and two output terminals coupled to the output capacitor. A coupling diode is coupled in forward connection from one output terminal to a terminal of the output buffer capacitor. A startup terminal of a converter circuit is coupled to the one output terminal to receive a startup current via the driven load if the load is present to conduct this current.

In the above, embodiments of the present invention has been explained with reference to block diagrams, which illustrate functional blocks of the device according to various embodiments of the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, or other programmable devices. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A load driver for driving a load, the load driver comprising:
    an output buffer capacitor;
    two output terminals coupled to the output buffer capacitor for coupling to the load;
    a coupling diode coupled in a forward direction from a first output terminal of the two output terminals to a first terminal of the output buffer capacitor;
    a positive voltage bus coupled to a second output terminal of the two output terminals and to a second terminal of the output buffer capacitor for providing a positive bias voltage to the load; and
    a converter circuit configured to output power through said two output terminals, the converter circuit comprising:
        a startup terminal configured to receive a startup current, wherein said startup terminal is coupled to said first output terminal; and
        a controllable switching element, wherein said startup terminal is connected to a control terminal of the controllable switching element such that the control terminal of the controllable switching element is in series connection with the two output terminals, and said switching element is turned on by the startup current;
    wherein the startup current is from the second output terminal of the two output terminals, through the load, to the first output terminal, to the startup terminal and into the control terminal of the controllable switching element when the load is coupled to the two output terminals, and
    wherein the coupling diode is configured to block current from the positive voltage bus towards the control terminal of the controllable switching element when the load is not coupled to the two output terminals.

2. A light emitting diode (LED) module, comprising:
    a load driver of claim 1; and
    at least one LED coupled between the two output terminals such that the control terminal of the controllable switching element is in series with the LED.

3. The load driver of claim 1, wherein the output buffer capacitor is in parallel with a series connection of the two output terminals and the diode; and the startup terminal connects to a junction between the two output terminals and the diode.

4. The load driver of claim 1, further comprising a starting resistor connected between the startup terminal and the first output terminal.

5. The load driver of claim 1, wherein the converter circuit further comprises a first diode with an anode connected to the startup terminal and a cathode to a ground.

6. The load driver of claim 1, wherein the converter circuit further comprises a storage capacitor coupled to the startup terminal, and wherein said startup current is for charging this storage capacitor to provide a startup voltage to the control terminal of the switching element.

7. The load driver of claim 1, further comprising a load resistor, in parallel connection with the output buffer capacitor, and the switching element comprises a MOSFET.

8. A load driver for driving a load, the load driver comprising:
    an output buffer capacitor;
    two output terminals coupled to the output buffer capacitor for coupling to the load;

a coupling diode coupled in a forward direction from a first output terminal of the two output terminals to a first terminal of the output buffer capacitor;

a positive voltage bus coupled to a second output terminal of the two output terminals and to a second terminal of the output buffer capacitor for providing a positive bias voltage to the load; and a converter circuit configured to output power through said two output terminals, the converter circuit comprising:

a startup terminal configured to receive a startup current, wherein said startup terminal is coupled to said first output terminal; and a controllable switching element, wherein said startup terminal is connected to a control terminal of the controllable switching element such that the control terminal of the controllable switching element is in series connection with the two output terminals, and said switching element is turned on by the startup current;

wherein the startup current is from the second output terminal of the two output terminals, through the load, to the first output terminal, to the startup terminal and into the control terminal of the controllable switching element when the load is coupled to the two output terminals, wherein the coupling diode is configured to block current from the positive voltage bus towards the control terminal of the controllable switching element when the load is not coupled to the two output terminals, wherein the output buffer capacitor is in parallel with a series connection of the two output terminals and the diode, and the startup terminal connects to a junction between the two output terminals and the diode, and wherein the load driver further comprises a load terminal coupled to said first terminal of the output buffer capacitor and to a cathode of the coupling diode, wherein the controllable switching element is connected between said load terminal and a ground bus, the controllable switching element being configured to selectively couple the load between the positive voltage bus and the ground bus to form a current loop, wherein said startup current turns on said switching element.

9. The load driver of claim 8, wherein said load terminal is coupled to said first terminal of the output buffer capacitor via a primary winding of a feedback transformer.

10. A load driver for driving a load, the load driver comprising:

an output buffer capacitor;

two output terminals coupled to the output buffer capacitor for coupling to the load;

a coupling diode coupled in a forward direction from a first output terminal of the two output terminals to a first terminal of the output buffer capacitor;

a positive voltage bus coupled to a second output terminal of the two output terminals and to a second terminal of the output buffer capacitor for providing a positive bias voltage to the load; and a converter circuit configured to output power through said two output terminals; the converter circuit comprising:

a startup terminal configured to receive a startup current, wherein said startup terminal is coupled to said first output terminal; and a controllable switching element, wherein said startup terminal is connected to a control terminal of the controllable switching element such that the control terminal of the controllable switching element is in series connection with the two output terminals, and said switching element is turned on by the startup current;

wherein the startup current is from the second output terminal of the two output terminals, through the load, to the first output terminal, to the startup terminal and into the control terminal of the controllable switching element when the load is coupled to the two output terminals, and wherein the coupling diode is configured to block current from the positive voltage bus towards the control terminal of the controllable switching element when the load is not coupled to the two output terminals, wherein the converter circuit further comprises a storage capacitor coupled to the startup terminal, and wherein said startup current is for charging the storage capacitor to provide a startup voltage to the control terminal of the switching element, and wherein the converter circuit further comprises a diac coupled between said storage capacitor and said control terminal of the switching element, to fire when the startup voltage of said storage capacitor has reached a threshold voltage.

11. The load driver of claim 10, wherein the switching element comprises a switching transistor which couples the load between the positive voltage bus and a ground, and said diac is coupled to a base terminal of the switching transistor.

12. The load driver of claim 11, wherein a collector terminal of said switching transistor is coupled to said load terminal.

13. The load driver of claim 11, wherein the switching transistor is a bipolar junction transistor, and the load driver further comprises:

a current sensing resistor, between an emitter terminal of the switching transistor and the ground; and a Darlington circuit, comprised of two NPN transistors, with a collector terminal connected to the startup terminal, an emitter terminal connected to the ground, and the base terminal connected to the emitter terminal of the switching transistor via a third resistor.

* * * * *